United States Patent
Wang et al.

(10) Patent No.: US 11,543,657 B2
(45) Date of Patent: Jan. 3, 2023

(54) OPTICAL LENS MODULE AND VIRTUAL REALITY DEVICE

(71) Applicants: BEIJING BOE OPTOELECTRONICS TECHNOLOGY CO., LTD., Beijing (CN); BOE TECHOLOGY GROUP CO., LTD., Beijing (CN)

(72) Inventors: Chenru Wang, Beijing (CN); Ruijun Dong, Beijing (CN); Yali Liu, Beijing (CN); Ke Li, Beijing (CN); Hao Zhang, Beijing (CN); Lili Chen, Beijing (CN)

(73) Assignees: BEIJING BOE OPTOELECTRONICS TECHNOLOGY CO., LTD., Beijing (CN); BEIJING BOE TECHNOLOGY DEVELOPMENT CO., LTD., Beijing (CN)

(*) Notice: Subject to any disclaimer, the term of this patent is extended or adjusted under 35 U.S.C. 154(b) by 328 days.

(21) Appl. No.: 16/756,609

(22) PCT Filed: Sep. 19, 2019

(86) PCT No.: PCT/CN2019/106682
§ 371 (c)(1),
(2) Date: Apr. 16, 2020

(87) PCT Pub. No.: WO2020/063446
PCT Pub. Date: Apr. 2, 2020

(65) Prior Publication Data
US 2021/0003846 A1 Jan. 7, 2021

(30) Foreign Application Priority Data
Sep. 30, 2018 (CN) .......................... 201811155871.5

(51) Int. Cl.
*G02B 27/01* (2006.01)
*G02B 25/00* (2006.01)

(52) U.S. Cl.
CPC ....... *G02B 27/0172* (2013.01); *G02B 25/008* (2013.01); *G02B 2027/0178* (2013.01)

(58) Field of Classification Search
CPC .............. G02B 27/0172; G02B 25/008; G02B 2027/0178; G02B 3/0087
See application file for complete search history.

(56) References Cited

U.S. PATENT DOCUMENTS

| 5,517,366 A | 5/1996 | Togino | |
|---|---|---|---|
| 6,010,647 A * | 1/2000 | Nomura | ................... G02C 7/06 351/159.41 |

(Continued)

FOREIGN PATENT DOCUMENTS

| CN | 2176553 Y | 9/1994 |
|---|---|---|
| CN | 1252133 A | 5/2000 |

(Continued)

OTHER PUBLICATIONS

First Office Action dated Feb. 25, 2020 for application No. CN201811155871.5 with English translation attached.

(Continued)

*Primary Examiner* — Andrew Sasinowski
(74) *Attorney, Agent, or Firm* — Nath, Goldberg & Meyer; Joshua B. Goldberg (57) ABSTRACT

The present disclosure discloses an optical lens module and a virtual reality device. The optical lens module includes: a lens assembly, and transflective layers attached to surfaces on a light incident side and a light emitting side of the lens assembly. The lens assembly includes a central region and at least one annular region surrounding the central region. The central region has a refractive index smaller than the at least (Continued)

one annular region. When more than one annular region is provided, the annular regions are sequentially arranged layer by layer, the annular region located on the outermost side has the maximum refractive index, and for any other annular region, the refractive index is smaller than that of the annular region located outside thereof.

12 Claims, 5 Drawing Sheets

(56) References Cited

U.S. PATENT DOCUMENTS

| | | | | |
|---|---|---|---|---|
| 6,094,242 | A | 7/2000 | Yamanaka | |
| 2002/0180662 | A1* | 12/2002 | Ko | G02B 27/0172 345/7 |
| 2018/0074325 | A1* | 3/2018 | Wheelwright | G02B 27/0176 |
| 2019/0045176 | A1* | 2/2019 | Ratcliff | H04N 13/307 |
| 2019/0377182 | A1* | 12/2019 | Sharp | G02B 27/0983 |
| 2020/0074724 | A1* | 3/2020 | Mathur | G06F 3/013 |
| 2020/0200950 | A1* | 6/2020 | Watson | G01B 11/24 |

FOREIGN PATENT DOCUMENTS

| | | |
|---|---|---|
| CN | 101019059 A | 8/2007 |
| CN | 101681028 A | 3/2010 |
| CN | 102736352 A | 10/2012 |
| CN | 203250039 U | 10/2013 |
| CN | 103733606 A | 4/2014 |
| CN | 104228092 A | 12/2014 |
| CN | 105652351 A | 6/2016 |
| CN | 106054390 A | 10/2016 |
| CN | 206002773 U | 3/2017 |
| CN | 206224048 U | 6/2017 |
| CN | 107065182 A | 8/2017 |
| CN | 207764398 U | 8/2018 |
| CN | 207833879 U | 9/2018 |
| JP | 2003035809 A | 2/2003 |

OTHER PUBLICATIONS

Office Action dated Oct. 12, 2020 issued in corresponding Chinese Application No. 201811155871.5.

* cited by examiner

OPTICAL LENS MODULE AND VIRTUAL REALITY DEVICE

CROSS-REFERENCE TO RELATED APPLICATION

This is a National Phase Application filed under 35 U.S.C. 371 as a national stage of PCT/CN2019/106682, filed Sep. 19, 2019, an application claiming the benefit of Chinese Application No. 201811155871.5, filed Sep. 30, 2018, the content of each of which is hereby incorporated by reference in its entirety.

TECHNICAL FIELD

The present disclosure relates to the technical field of optical instruments, in particular to an optical lens module and a virtual reality device.

BACKGROUND

With the development of science and technology and the improvement of living standard of people, higher requirements are put forward on the display effect of various display devices. In order to meet the needs of people as well as requirements of the market, the Virtual Reality (VR) technology has experienced rapid application and development in the display field in recent years, and has become a hot spot of current application research.

Among others, the optical lens module is a core component of a VR device, and the optical performance of the optical lens module direct influences experience of the VR device. Current optical lens modules for VRs typically have a relatively long focal length, resulting in a relatively long distance (also called back focal length) between the display screen and the optical lens, and then, the entire VR device has a relatively large volume and heavy weight, thereby influencing the user experience.

SUMMARY

To solve at least one of the problems in the related art, the present disclosure provides an optical lens module and a virtual reality device.

To achieve the above object, the present disclosure provides an optical lens module, including: a lens assembly, and transflective layers attached to surfaces on a light incident side and a light emitting side of the lens assembly, wherein the lens assembly includes a central region and at least one annular region surrounding the central region; and wherein the central region has a refractive index smaller than that of the at least one annular region, when more than one annular region is provided, the annular regions are sequentially arranged layer by layer, the annular region located on the outermost side has the maximum refractive index, and for any other annular region, the refractive index is smaller than that of the annular region located outside thereof.

Optionally, the central region has a circular shape, and the annular region has a ring shape.

Optionally, the lens assembly includes: at least one magnifying lens arranged in sequence along an optical axis direction of the lens assembly.

Optionally, the magnifying lens includes: a liquid crystal lens.

Optionally, each of the magnifying lenses includes at least one of a plano-convex lens, a biconvex lens, and a meniscus lens.

Optionally, the magnifying lens includes a first magnifying lens and a second magnifying lens, and an optical axis of the first magnifying lens is collinear with an optical axis of the second magnifying lens.

Optionally, the first magnifying lens and/or the second magnifying lens is a radial gradient index lens having a smaller refractive index at a center than at an edge.

Optionally, each of the first magnifying lens and the second magnifying lens is a plano-convex lens, a planar optical surface of the first magnifying lens is attached to a planar optical surface of the second magnifying lens, and the two transflective layers are respectively attached to a convex optical surface of the first magnifying lens and a convex optical surface of the second magnifying lens.

Optionally, the transflective layer is selected from one of: a transflective film adhered to a surface of the lens assembly by a film adhesion process; and, a transflective film deposited on a surface of the lens assembly by a coating process.

To achieve the above object, the present disclosure provides a virtual reality device, including: an optical lens module as described above.

Optionally, the virtual reality device further includes: a display screen located on the light incident side of the lens assembly.

Optionally, the virtual reality device is a glasses-type virtual reality device or a helmet-type virtual reality device.

DETAILED DESCRIPTION OF THE EMBODIMENTS

To improve understanding of the technical solution of the present disclosure for those skilled in the art, the optical lens module and virtual reality device provided in the disclosure will be described below in detail in conjunction with the accompanying drawings.

Figure 1:
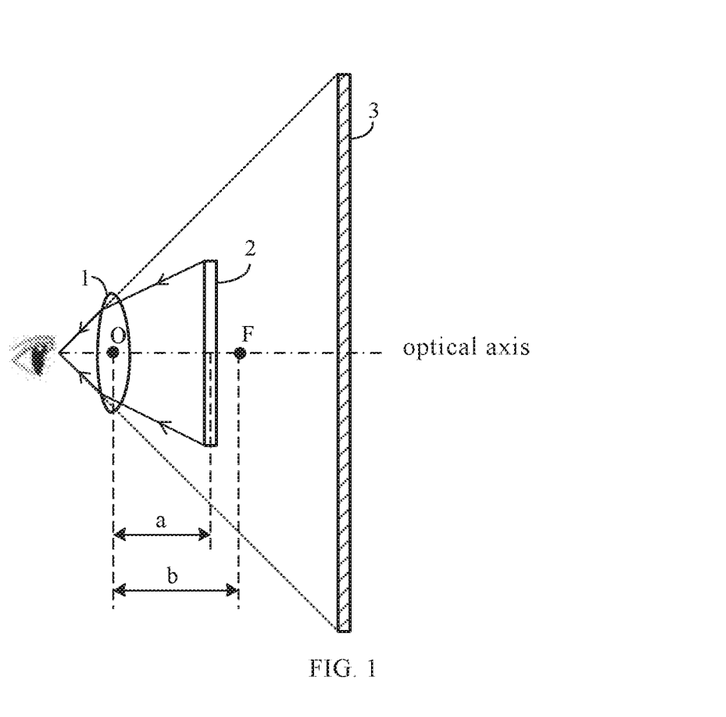
FIG. 1 is a schematic diagram of optical paths of the VR imaging technique.

FIG. 1 is a schematic diagram of optical paths of the VR imaging technique. As shown in FIG. 1, a VR device typically includes a housing (not shown) and an optical lens module 1. The housing is configured to carry the optical lens module 1 and a display screen 2, and the optical lens module is configured to magnify a display image provided by the display screen. In use, the display screen 2 is fixed on the housing 1 with a display surface of display screen 2 facing the optical lens module 1. After the display image provided by the display screen is magnified by the optical lens module 1, people's eyes will observe an erected and magnified virtual image 3, thereby realizing VR demonstration.

In order to ensure the imaging effect, a distance a between the display screen 2 and an optical center O (a point on the optical axis; all light passing through the point has an unchanged propagation direction) of the optical lens module 1 needs to be slightly shorter than a focal length b (a distance between a focal point F and the optical center O) of the optical lens module 1. That is, the display screen 2 should be placed between the optical lens module 1 and the focal point F and closer to the focal point F.

Consequently, when the focal length b of the optical lens module 1 is longer, the distance a required between the display screen 2 and the optical center O of the optical lens module 1 is also longer, and at this time, a larger volume of the housing is required, finally leading to a larger and heavier VR device as a whole, which is inconvenient for the user to wear and thus influences user's experience.

To solve the above technical problem, a method of reducing the focal length b of the optical lens module 1 is often adopted currently so that the distance a required between the display screen 2 and the optical center O of the optical lens module 1 is also reduced. Specifically, a relatively thicker magnifying lens is selected as the optical lens module, or a magnifying lens with a relatively larger surface curvature is selected as the optical lens module. However, in practical applications, it is found that although the focal length b of the optical lens module 1 can be reduced to some extent by the above two methods, the use of the thicker magnifying lens as the optical lens module will inevitably increases the weight of the optical lens module and thus increases the overall weight of the VR device. On the other hand, when using a magnifying lens with a larger curvature as the optical lens module 1, the larger the curvature of the magnifying lens is, the higher production process is required, and the more difficult preparation is involved, which means mass production is very difficult.

In view of the above issues, the present disclosure provides an optical lens module having advantages such as a shorter focal length, a lighter weight and thinner profile, and easy processability compared with existing optical lens modules.

Figure 2:
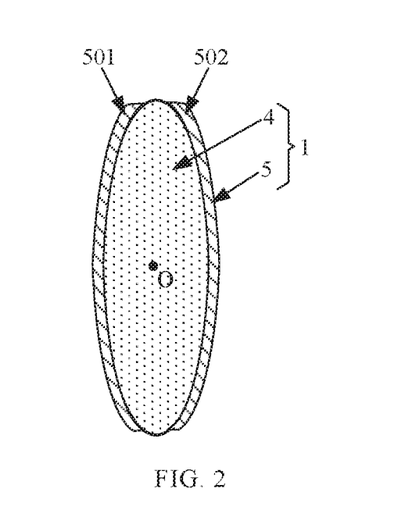
FIG. 2 is a schematic structural diagram of an optical lens module according to an embodiment of the disclosure.

FIG. 2 is a schematic structural diagram of an optical lens module according to an embodiment of the disclosure. As shown in FIG. 2, the optical lens module 1 includes: a lens assembly 4, and transflective layers 5 attached to surfaces on a light incident side and a light emitting side of the lens assembly 4; where each of the transflective layers 5 may reflect one part of the light incident thereon and transmit the other part.

Among others, the "light incident side" of the lens assembly 4 specifically refers to a side of the lens assembly 4 facing the display screen 2 when the lens assembly 4 is assembled in the virtual reality device; and the "light emitting side" of the lens assembly 4 specifically refers to a side to be viewed by a user when the lens assembly 4 is assembled in the virtual reality device.

For convenience of description, the transflective layer 5 attached to the surface on the light incident side of the lens unit 4 is referred to as a first transflective layer 501, and the transflective layer 5 attached to the surface on the light emitting side of the lens unit 4 is referred to as a second transflective layer 502.

In the following description, a case where the first transflective layer 501 and the second transflective layer 502 each have a light transmittance of 50% and a refractive index of 50% is taken as an example.

Figure 3:
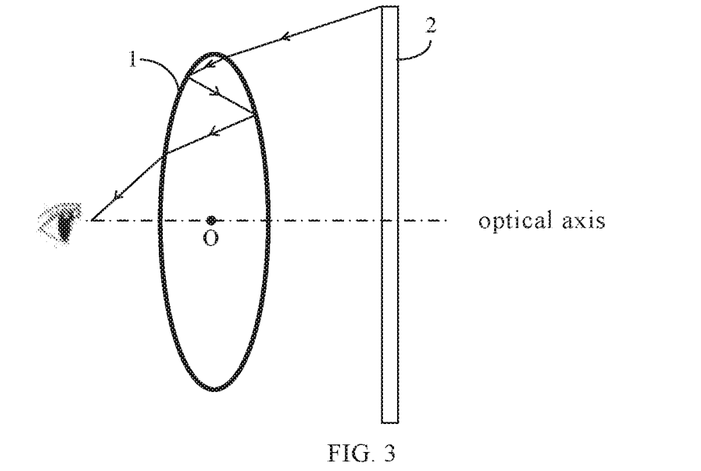
FIG. 3 is a schematic diagram of optical paths of the optical lens module shown in FIG. 2 for VR display.

FIG. 3 is a schematic diagram of optical paths of the optical lens module 1 shown in FIG. 2 for VR display. As shown in FIG. 3, a part of the light emitted from the display screen 2 reaches the surface of the first transflective layer 501, where half of the light is transmitted through the first transflective layer 501 and enters the lens assembly 4; then, the light transmitted to the lens assembly 4 is propagated to the second transflective layer 502, where half of the light is reflected and emitted to the first transflective layer 501; then, for the light in the lens assembly 4 and emitted to the first transflective layer 501, when the light is propagated to the first transflective layer 501, half of the light is reflected and emitted to the second transflective layer 502 again; finally, for the light reflected by the first transflective layer 501 and emitted to the second transflective layer 502, when the light is propagated to the second transflective layer 502, half of the light is transmitted through the second transflective layer 502 and emitted to human eyes to form an image in the human eyes. For convenience of description, the light finally emitted to the human eyes is referred to as effective light.

The effective light is sequentially transmitted through the first transflective layer 501, reflected by the second transflective layer 502, reflected by the first transflective layer 501, and transmitted through the second transflective layer 502. During this process, the effective light passes through the lens assembly 4 three times, which may be equivalently regarded as passing through three lens assemblies 4 arranged side by side along the optical axis direction. Therefore, the optical lens module 1 has an enhanced capability of effective light convergence, and thus the focal length of the optical lens module 1 is reduced only for the effective light. At this time, the distance between the display screen 2 and the optical center of the optical lens module 1 may be correspondingly reduced; and accordingly, the overall size of the VR device may be reduced.

In the present disclosure, a transflective film may be adhered to a surface of the lens assembly 4 by a film adhesion process to obtain the transflective layer 5; alternatively, a transflective material (forming a transflective film) may be deposited on a surface of the lens assembly 4 by a coating process to obtain the transflective layer 5. The film adhesion process and the coating process belong to mature processes in the field, have relatively low process difficulty and thus are suitable for mass production.

Meanwhile, the transflective layer 5 has the characteristics of light weight and thin film, and thus does not substantially affect the overall weight and size of the optical lens module 1.

In this embodiment, optionally, the lens assembly 4 includes: at least one magnifying lens arranged in sequence along an optical axis direction of the lens assembly 4, which reduces the focal length more effectively. Further optionally, the magnifying lens may be selected from a group consisting of a plano-convex lens, a biconvex lens, and a meniscus lens. Obviously, the magnifying lens in the present disclosure may also be a liquid crystal lens; and when the magnifying lens adopts the liquid crystal lens, the refractive index of various regions of the liquid crystal lens may be flexibly adjusted by means of electric field control, so as to meet the requirements of different scenarios.

It should be noted that the technical solution of the present disclosure does not limit the type or shape of the magnifying lens.

Figure 4:
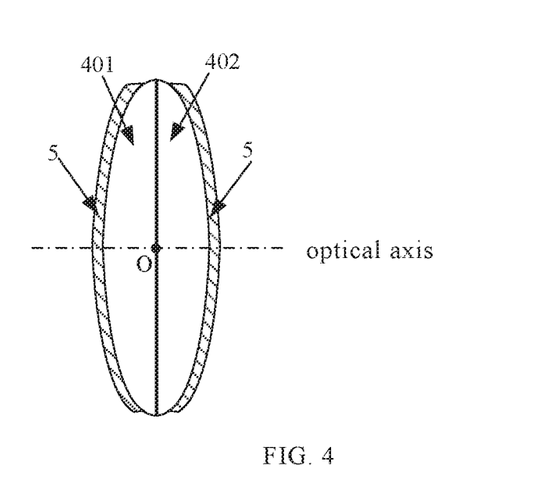
FIG. 4 is a schematic structural diagram of the lens assembly of the present disclosure.

FIG. 4 is a schematic structural diagram of the lens assembly of the present disclosure. As shown in FIG. 4, the lens assembly 4 includes two magnifying lenses, i.e., a first magnifying lens 401 and a second magnifying lens 402, and an optical axis of the first magnifying lens 401 is collinear with an optical axis of the second magnifying lens 402. The first magnifying lens 401 and the second magnifying lens 402 may be disposed in contact (in the case where shapes of opposing surfaces of the two can be perfectly matched, the two may be perfectly fitted) or spaced apart.

At this time, the two transflective layers 5 are respectively disposed on a surface on a side of the first magnifying lens 401 facing away from the second magnifying lens 402 and a surface on a side of the second magnifying lens 402 facing away from the first magnifying lens 401.

Further optionally, each of the first magnifying lens 401 and the second magnifying lens 402 is a plano-convex lens, a planar optical surface of the first magnifying lens 401 is attached to a planar optical surface of the second magnifying lens 402, and the two transflective layers 5 are respectively attached to a convex optical surface of the first magnifying lens 401 and a convex optical surface of the second magnifying lens 402.

In the present disclosure, a combination of two plano-convex lenses can achieve the same magnification effect as one biconvex lens. In terms of processing, processing two plano-convex lenses is less difficult than processing one biconvex lens.

It should be noted that one, two or more magnifying lenses may be provided in the present disclosure (in case of more than two magnifying lenses, no corresponding figure is given); when more than one magnifying lens is provided, adjacent magnifying lenses may be arranged in contact or at intervals as long as the optical axes of all magnifying lenses are on the same straight line.

Figure 5:
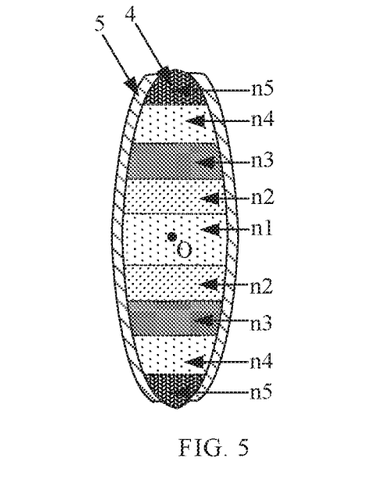
FIG. 5 is a schematic structural diagram of an optical lens module according to an embodiment of the disclosure.
Figure 6:
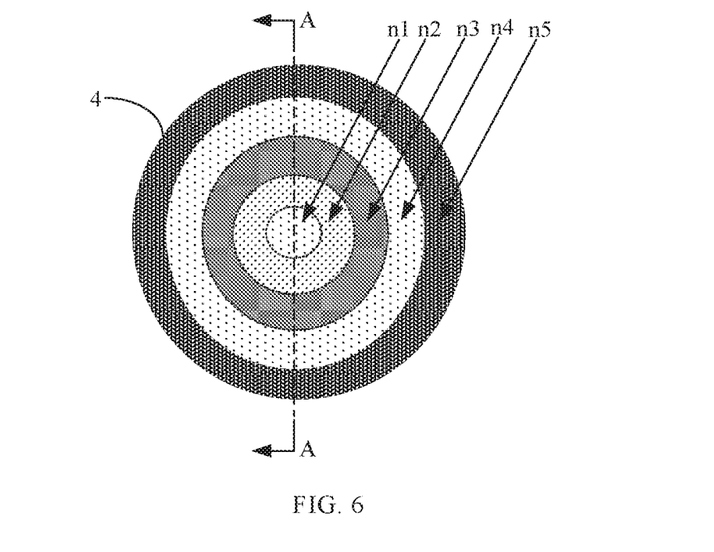
FIG. 6 is a side view of the lens assembly of FIG. 5.
Figure 7:
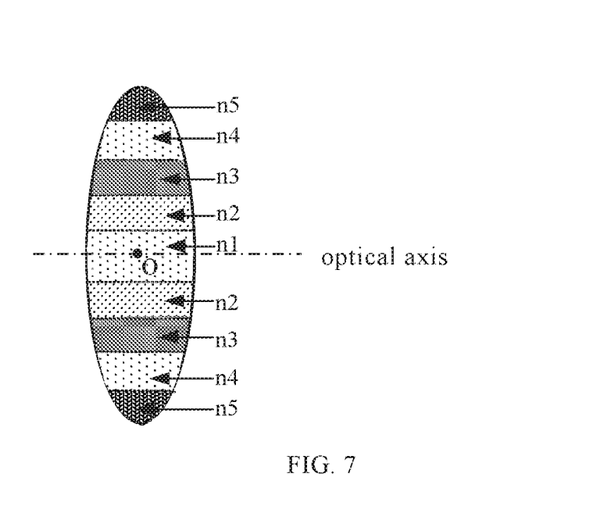
FIG. 7 is a schematic cross-sectional view taken along line A-A of FIG. 6.

FIG. 5 is a schematic structural diagram of an optical lens module according to an embodiment of the disclosure, FIG. 6 is a side view of the lens assembly of FIG. 5, and FIG. 7 is a schematic cross-sectional view taken along line A-A of FIG. 6. As shown in FIGS. 5 to 7, the technical solution of the present disclosure is an improved solution based on the above embodiments. The same features as those of the above embodiments will not be described again. Specifically, the lens assembly 4 may further include: a central region n1 and at least one annular region n2/n3/n4/n5 surrounding the central region. The central region n1 has the minimum refractive index, i.e., the central region has a refractive index smaller than the annular region n2/n3/n4/n5. When more than one annular region n2/n3/n4/n5 is provided, the annular regions n2/n3/n4/n5 are sequentially arranged layer by layer, the annular region n5 located on the outermost side has the maximum refractive index, and for any other annular region n2/n3/n4, the refractive index is smaller than that of the annular region located outside thereof. Any two regions of the lens assembly 4 that are symmetric about the optical axis have the same refractive index. The optical lens module of this embodiment has advantages such as a shorter focal length, a lighter weight and thinner profile, and easy processability, while expanding the viewing angle at the same time.

In this case, the lens assembly 4 is a radial gradient index lens assembly, and the annular regions n2/n3/n4/n5 have sequentially increasing refractive indices in a radial direction from the center toward the edge.

Optionally, the central region n1 has a circular shape, and the annular region n2/n3/n4/n5 has a ring shape.

It should be noted that the case in the drawings, where four annular regions n2/n3/n4/n5 are provided, the central region n1 has a circular shape, and the annular region n2/n3/n4/n5 has a ring shape, is merely exemplary, and does not configure any limitation to the technical solution of the disclosure. In the present disclosure, the shape of the central region and the number and shape of the annular regions may be set according to actual needs.

Figure 8:
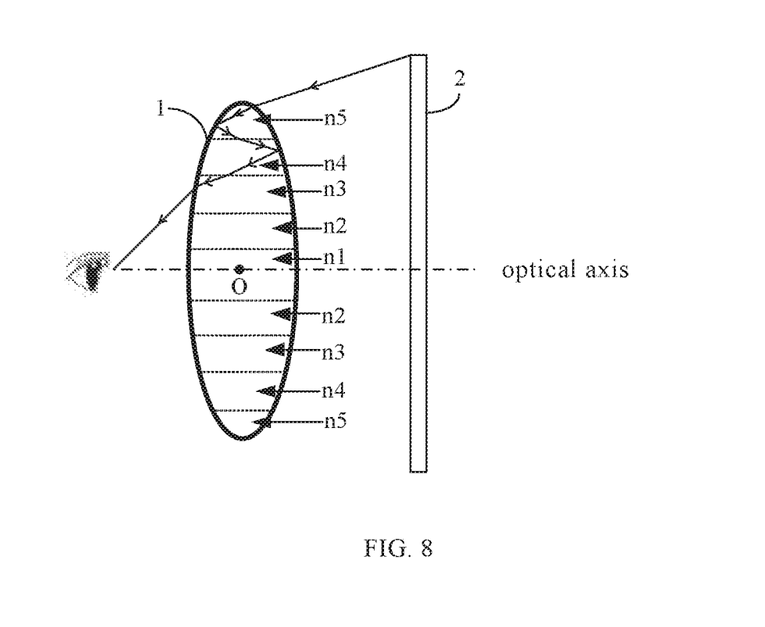
FIG. 8 is a schematic diagram of optical paths of the optical lens module shown in FIG. 5 for VR display.

FIG. 8 is a schematic diagram of optical paths of the optical lens module shown in FIG. 5 for VR display. As shown in FIG. 8, when light rays are propagated in the radial gradient index lens assembly 4, refraction happens at an interface between the central region and an annular region and at an interface between two annular regions, and the overall movement trend of the light rays is to propagate to a position closer to the optical center. When the effective light enters an inner annular region (or the central region) from an outer annular region, since the outer annular region has a refractive index greater than the inner annular region (or the central region), the effective light is refracted, and an angle between the refracted effective light and a horizontal direction is reduced.

Figure 9:
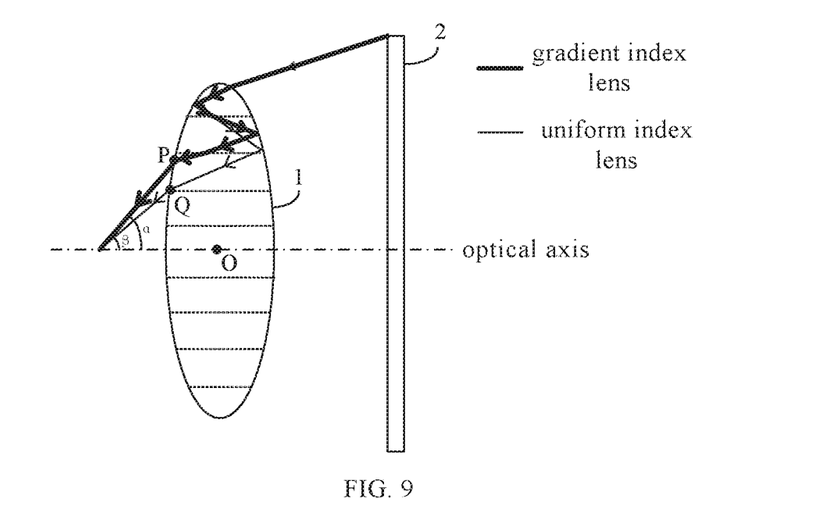
FIG. 9 is a schematic diagram showing comparison of optical paths of the effective light in a radial gradient index lens assembly and in a uniform index lens assembly.

FIG. 9 is a schematic diagram showing comparison of optical paths of the effective light in a radial gradient index lens assembly and in a uniform index lens assembly. As shown in FIG. 9, when the effective light is propagated in the radial gradient index lens assembly, the effective light is refracted, and each time the effective light is refracted, the angle between the effective light and the horizontal direction is reduced and the effective light is emitted from a point P in the lens assembly toward human eyes. In a uniform index lens assembly, the effective light is not refracted (linearly propagated), and is emitted from a point Q in the lens assembly 4 toward human eyes. As can be seen from the drawings, a distance between the point P and the optical axis in the vertical direction is longer than a distance between the point Q and the optical axis in the vertical direction, and the angle α is greater than the angle β.

Assuming that the effective light in FIG. 9 is light emitted from pixels at an upper edge of the display screen 2, when a radial gradient index lens assembly 4 is used, the vertical Field of View (FOV) of human eyes is 2α; when a uniform index lens assembly 4 is used, the vertical FOV of human eyes is 2β. Since the angle α is greater than the angle β, the vertical FOV of human eyes can be effectively increased with the radial gradient index lens assembly 4 as compared with the uniform index lens assembly 4. Similarly, the horizontal FOV of human eyes can also be improved.

Therefore, by means of the radial gradient index lens 4 and the annular regions having sequentially increasing refractive indices in the radial direction from the center toward the edge, the FOV of human eyes can be effectively improved, and the experience of the user can also be improved.

In this embodiment, the transflective layer 5 cooperated with the radial gradient index lens assembly 4 may enable the optical lens module 1 advantages such as a shorter focal length, a wider viewing angle, and a lighter weight and thinner profile.

Figure 10:
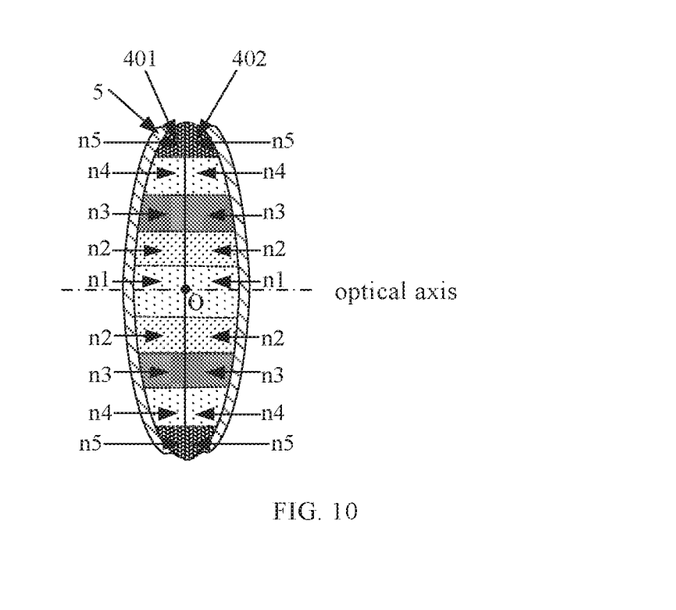
FIG. 10 is another schematic structural diagram of the lens assembly of the present disclosure.

FIG. 10 is another schematic structural diagram of the lens assembly of the present disclosure. As shown in FIG. 10, the lens assembly is an embodiment of the lens assembly shown in FIG. 6. The lens assembly 4 includes a first magnifying lens 401 and a second magnifying lens 402, each of the first magnifying lens 401 and the second magnifying lens 402 is a plano-convex lens, a planar optical surface of the first magnifying lens 401 is attached to a planar optical surface of the second magnifying lens 402, and the two transflective layers 5 are respectively attached to a convex optical surface of the first magnifying lens 401 and a convex optical surface of the second magnifying lens 402.

The first magnifying lens 401 and/or the second magnifying lens 402 is a radial gradient index lens having a smaller refractive index at a center than at an edge so that the central region of the formed lens assembly 4 has the minimum refractive index, the annular region located on the outermost side has the maximum refractive index, and for any other annular region, the refractive index is smaller than that of the annular region located outside thereof. Any two regions of the lens assembly 4 that are symmetric about the optical axis have the same refractive index (i.e., the lens assembly shown in FIG. 6).

It should be noted that the drawings only exemplify the case where each of the first magnifying lens 401 and the second magnifying lens 402 is a radial gradient index lens.

In this embodiment, the radial gradient index lens may be prepared by a segmented injection moulding process or a segmented splicing process. Obviously, the radial gradient index lens may also be a liquid crystal lens, and the refractive index of various regions of the liquid crystal lens may be adjusted by means of electric field control.

A third embodiment of the present disclosure provides a virtual reality device, including: an optical lens module which may be provided by the above embodiments.

As can be seen from the foregoing, a virtual reality device with the optical lens module provided in the above embodiments has the advantages such as a smaller volume, a lighter weight, a wider viewing angle, and easy productability.

Optionally, the virtual reality device further includes: a display screen which may be a liquid crystal display screen or an organic electroluminescent display screen. The display screen may be a flexible display screen or a transparent display screen.

In the present disclosure, the virtual reality device may be specifically a glasses-type virtual reality device (the housing may be a glasses-type housing) or a helmet-type virtual reality device (the housing may be a helmet-type housing).

It will be appreciated that the above embodiments are merely exemplary embodiments for the purpose of illustrating the principle of the disclosure, and the disclosure is not limited thereto. Various modifications and improvements can be made by a person having ordinary skill in the art without departing from the spirit and essence of the disclosure. Accordingly, all of the modifications and improvements also fall into the protection scope of the disclosure.

What is claimed is:

1. An optical lens module, comprising: a lens assembly, and transflective layers attached to surfaces on a light incident side and a light emitting side of the lens assembly,
   wherein the lens assembly comprises a central region and at least one annular region surrounding the central region; and
   wherein the central region has a refractive index smaller than that of the at least one annular region,
   when more than one annular region is provided, the annular regions are sequentially arranged layer by layer, the annular region located on the outermost side has the maximum refractive index, and for any other annular region, the refractive index is smaller than that of the annular region located outside thereof.

2. The optical lens module according to claim 1, wherein the central region has a circular shape, and the annular region has a ring shape.

3. The optical lens module according to claim 1, wherein the lens assembly comprises: at least one magnifying lens arranged in sequence along an optical axis direction of the lens assembly.

4. The optical lens module according to claim 3, wherein the magnifying lens comprises: a liquid crystal lens.

5. The optical lens module according to claim 3, wherein the magnifying lens comprises at least one of a plano-convex lens, a biconvex lens, and a meniscus lens.

6. The optical lens module according to claim 3, wherein the magnifying lens comprises a first magnifying lens and a second magnifying lens, and an optical axis of the first magnifying lens is collinear with an optical axis of the second magnifying lens.

7. The optical lens module according to claim 6, wherein the first magnifying lens and/or the second magnifying lens is a radial gradient index lens having a smaller refractive index at a center than at an edge.

8. The optical lens module according to claim 6, wherein each of the first magnifying lens and the second magnifying lens is a plano-convex lens, a planar optical surface of the first magnifying lens is attached to a planar optical surface of the second magnifying lens, and the two transflective layers are respectively attached to a convex optical surface of the first magnifying lens and a convex optical surface of the second magnifying lens.

9. The optical lens module according to claim 1, wherein the transflective layer is selected from one of:
   a transflective film adhered to a surface of the lens assembly by a film adhesion process; and
   a transflective film deposited on a surface of the lens assembly by a coating process.

10. A virtual reality device, comprising: an optical lens module according to claim 1.

11. The virtual reality device according to claim 10, further comprising: a display screen located on the light incident side of the lens assembly.

12. The virtual reality device according to claim 10, wherein the virtual reality device is a glasses-type virtual reality device or a helmet-type virtual reality device.

* * * * *